…

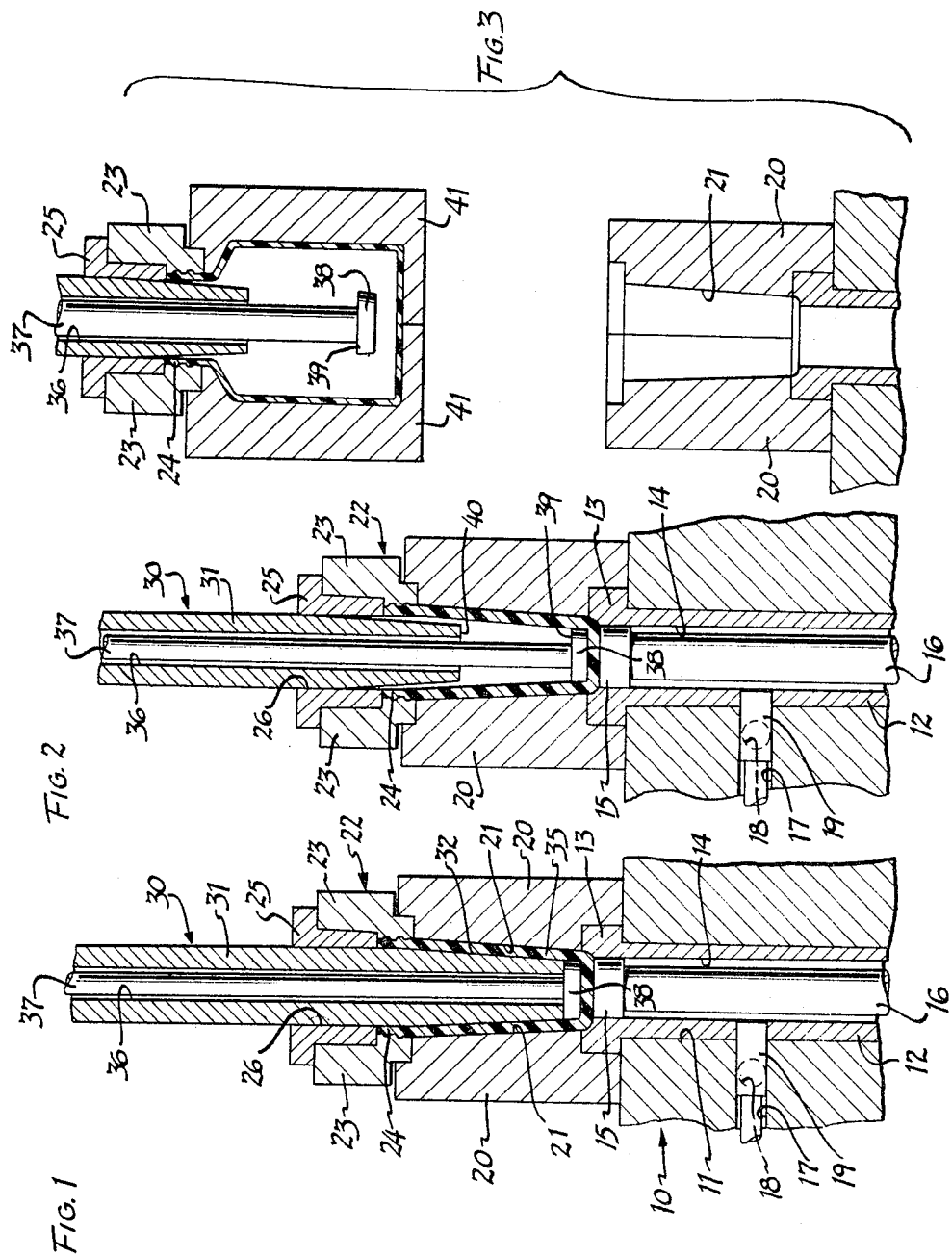

United States Patent Office 3,280,236
Patented Oct. 18, 1966

3,280,236
METHOD OF AND APPARATUS FOR MAKING PLASTIC ARTICLES
Lawrence D. Ninneman and Anthony J. Scalora, Toledo, Ohio, assignors to Owens-Illinois Glass Company, a corporation of Ohio
Filed Feb. 4, 1963, Ser. No. 255,856
2 Claims. (Cl. 264—97)

The present invention relates to a method of making a plastic article and more particularly to a method and apparatus wherein a blow molded article is manufactured by injection molding a parison or preform about an interior, multi-part mandrel, the parts of which are subsequently separated to inject a blowing medium into the parison.

In the presently pending, earlier filed application of Thomas R. Santelli, Serial No. 146,686, filed October 17, 1961, now abandoned, assigned to the assignee of the present invention, there is disclosed and claimed a novel blown plastic article which is formed by an injection molding process carried out at relatively low injection pressures to form a parison which is particularly well adapted to blowing, since both the parison and the final article are free of those thermally induced stress concentrations which are uniformly present in blow molded articles made from conventional injection molded preforms.

The present invention relates to an improved method of for performing both the injection molding and blow molding steps of this process.

More specifically, the present invention contemplates the injection molding of the parison about an interior mandrel or parison sleeve which is positioned centrally of an injection molding cavity, the mandrel forming the core of the cavity in which the sleeve-like, subsequently blown portions of the parison are formed and further serving as the core of the neck or finish mold, in the event a container or the like is to be made by the process. The mandrel further serves to introduce the blowing medium, such as air, into the interior of the parison during the blow molding operation.

For this purpose, the mandrel is tubular and is provided with a valve head closing the open end thereof during the injection molding operation. This valve head is mounted upon an actuating rod extending axially through the mandrel, and the mandrel is retractable from contact with this valve head following injection molding so that air can be introduced between the mandrel and the actuating rod for escape through the open end of the mandrel into the interior of the injection molded parison. This valve head also serves the function of supporting the bottom interior wall of the parison as the parison is removed from the injection mold and transferred to a blow mold.

The novel process of the present invention thus includes the initial formation of an injection molding cavity by juxtaposed peripherally enclosing finish mold and parison mold elements and by the mandrel projecting through the finish mold into the parison mold, the free end of the mandrel being closed by the valve head so that the mandrel and the valve head present a smooth composite exterior surface about which the parison is injection molded. The open bottom of the injection mold is closed by the injection ram which displaces plasticized material into the mold space and compacts the same therein.

Following injection molding, the mandrel is retracted at least partially from the mold space, the valve head cooperates with the finish mold to maintain the parison ends in their initial relative positions, the parison is stripped from the parison mold and is transferred to a blowing station in which the parison is enclosed within a separable blow mold and finally inflated by air under pressure introduced through the mandrel.

It is, therefore, an important object of the present invention to provide a new and improved method of and apparatus for making a blown plastic article.

Another important object of the present invention is to provide an improved method of making a blown plastic article by the injection of air into an injection molded parison through a mandrel element about which the parison is injection molded.

It is a further important object of the present invention to provide a method of and apparatus for manufacturing a blown plastic article wherein a parison having an integral neck section is injection molded and a mold space defined peripherally about an axially displaceable mandrel, displacing the mandrel axially of the parison, transferring the parison to a remote blowing station, and injecting air through the mandrel into the interior of the parison after the parison has been enclosed in a blow mold.

Other objects of this invention will appear in the following description and appended claims, reference being had to the accompanying drawings forming a part of this specification wherein like reference characters designate corresponding parts in the several views.

On the drawings:

FIGURE 1 is a vertical sectional view of an apparatus of the present invention capable of carrying out the method of the present invention, the apparatus being shown in its relative positions occupied during injection molding of the parison.

FIGURE 2 is a view similar to FIGURE 1 illustrating retraction of the mandrel prior to removal of the parison from the parison mold.

FIGURE 3 is a view similar to FIGURE 2, but illustrating the parison after it has been blown to shape in a surrounding blow mold.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

As illustrated in FIGURE 1 of the drawings, reference numeral 10 refers generally to an injection mold block provided with one or more vertical bores 11 within each of which is positioned a feed sleeve 12. The feed sleeve 12 is provided with an upper enlarged embossment 13 seated on the upper surface of the block 10 and with an interior cylindrical bore 14 within which is reciprocable an injection molding piston 15 having an actuating rod 16 projecting through the bore 14 for actuation by an exterior power source, such as a hydraulic cylinder as well illustrated in the above-identified application of Thomas R. Santelli.

Plasticized plastic material is supplied to the bore 14 by means of a lateral feed bore 17 communicating with a source of plasticized material, as through aperture 18, the plasticized material being supplied to the bore 14 from the bore 17 by means of a feed piston 19 reciprocable in the feed bore 17.

Superimposed upon the block 10 are a pair of injection mold sections 20, these injection mold sections 20 cooperatively forming a parison mold and being relatively laterally separable by suitable means (not shown) as described in said Santelli application. The parison molds 20 clamp about the embossment 13 of the feed sleeve 12 and define, at their inner surfaces, a parison mold wall 21. It will be noted that this parison mold 21, cooperatively defined by the parison mold sections 20, is tapered inwardly and downwardly toward the lower parison extremity. Superimposed upon the parison mold sections 20 is a sectional neck mold 22, the sections 23 of which enclose a neck mold space 24 appropriately contoured to define the threads or finish portion of a container. The upper extremity of the neck mold space 24 is closed by a plug 25.

Projecting through the plug 25 and the neck mold 22 is a parison mandrel or sleeve 30, this sleeve having an upper cylindrical portion 31 snugly mating with the cylindrical bore 26 of the plug 25 and having a lower, frustoconical or tapered portion 32 which cooperates with the parison mold surfaces 21 to define therebetween the parison mold space 35. This mandrel 30 is provided with an internal bore 36 through which projects an actuating rod 37 carrying at its lower extremity a valve head 38. The valve head 38 is of substantially the same diameter as the lower extremity of the mandrel 30 and has a flat upper surface 39 adapted to sealingly contact the free open end 40 of the mandrel 30.

The operation of the apparatus thus described will be readily seen by a comparison of FIGURES 1 and 2.

Initially, the mold space 35 is defined by closure of the parison mold sections 20 about the upper extremity 13 of the feed sleeve 12, the positioning of the neck mold 22, including the plug 25 upon the parison mold sections 20, and the insertion of the mandrel 30 through the plug 25 to depend into the parison mold sections. The mold space 35, thus defined, is closed upon actuation of the piston 15 to its illustrated position of FIGURE 1 displacing plasticized material into the mold space 35.

Following the injection molding of the plasticized material in the space 35, the mandrel 30 is retracted vertically upwardly to its position of FIGURE 2, thus spacing the mandrel end surface 40 substantially from the valving face 39 of the valve head 38. Of course, following the injection molding of plasticized material in the space 35, the material rapidly cools to a self-sustaining state and, following retraction of the mandrel, the walls of the parison will thermally shrink away from the walls of the parison mold sections 20. Additionally, the retraction of the mandrel from contact with the parison will move the chilling effect from the interior walls of the parison and shrinkage away from the chill walls 21 of the parison mold section 20 will continue to increase the shrinkage effect. Also, it will be noted that retraction of the mandrel 30 completely removes the mandrel from contact with all of the parison, including that portion of the parison filling the finish mold space 24, due to the tapered configuration of the walls 32 of the mandrel.

Next, the parison is stripped from the mold space 35, preferably by laterally opening the parison mold sections 20. Alternatively, the parison may be stripped vertically or axially from the mold space, particularly since the parison is still fully supported by the finish mold 22 and by the valve head 38. In any event, the parison is now transferred to a remote blow molding station at which it is enclosed between the sections 41 of a sectional blow mold, and air is now introduced through the bore 36 of the mandrel and about the actuating rod 37 of the valve head 38 to inflate the parison against the chill walls of the mold sections 41. By virtue of the prior retraction of the mandrel, air enters the mandrel through the space intermediate the extremity 40 of the mandrel and the valving face 39 of the valve head 38. This relatively large area prevents any "blowing out" of the parison and promotes the rapid and accurate filling of the parison to distend the same laterally outwardly to its final blow molded configuration. Additionally, the tapered configuration of the mandrel requires only slight mandrel retraction to initially remove the mandrel from contact with the inner surfaces of the parison. Also, mandrel retraction exposes the interior surface of the finish portion of the parison to blow air, thereby further chilling the finish portion and forming a finish which is partially blown and partially injection molded.

It will be particularly noted that the parison end wall defined between the valve head 38 and the injection ram 15 is the last portion of the parison to be inflated and this portion of the parison is in closely spaced relation to the bottom wall of the blow mold, so that the parison is maintained in proper alignment with the blow mold cavity until substantially fully inflated.

The advantages of the present invention will be readily appreciated, these advantages residing primarily in the arrangement of the parison mandrel comprising the sleeve 30 and the valve head 38. It will be noted that the parison sleeve 30 has an upper cylindrical portion 31 which projects through the annular plug 25 in sealing engagement therewith and a lower tapered portion 32. The cylindrical portion 31 cooperates with the neck mold 22 to define the inner surface of the injection molded neck, while the lower tapered portion forms the inner surface of the remainder, i.e. the blowable portion, of the parison. Of course, if desired the inner surface of the neck may also be tapered, but this is not generally the case.

The utility of the tapered lower portion 32 of the mandrel resides in the fact that limited retraction of the sleeve will expose all of the correspondingly tapered inner surface of the parison and even the inner surface of the neck portion to blow air. Thus, any danger of "blow out" of the parison is substantially eliminated, even at high blowing pressures. Further, the retraction of the mandrel sleeve will expose the inner surface of the neck portion to blowing air to aid in chilling the finished portion of the container. By correspondingly tapering the valve plug portion 28, movement of the parison from the valve surface and onto the chill walls of the blow mold sections 41 is also improved.

In addition to the ease of blowing and chilling by virtue of the tapered portion 32 of the mandrel sleeve, the retraction of the sleeve while the injection molded parison is still in the parison mold aids in stripping the parison from the parison mold because of the enhanced, radially inward thermal shrinkage from the parison wall without interference by the mandrel. This is accomplished by the tapered mandrel surface 32 since axial retraction will simultaneously space all portions of the parison inner surface from the mandrel.

In contrast, the retraction of a cylindrical mandrel sleeve would merely progressively free the inner surface of the parison from contact with the mandrel sleeve. Additionally, the valve head 38 is retained in its position of FIGURE 2 as the tapered mandrel sleeve is retracted to stabilize the parison within the parison mold and during transfer to the blow mold sections 41 despite loss of contact between the mandrel sleeve and the inner surface of the parison.

All in all, it will be appreciated that the present invention provides a new and improved method of and apparatus for the manufacture of a blown plastic article from an injection molded parison.

We claim:
1. In a method of making a blown plastic container by inflating an injection molded parison interiorly of a blow mold to which the parison is transferred after being initially formed; the steps of injection molding the parison in a multi-part injection mold having a first part defining the exterior portions of the container finish, a second part defining the subsequently inflatable portion of the parison, and a third part formed as a core sleeve, at least that portion of said third part defining the interior peripheral surface of the inflatable portion of said parison being tapered; prior to inflating the parison, relatively moving the parts of the injection mold and the parison (1) to expose at least the inflatable portion of the parison exteriorly of the first and second mold parts and (2) to axially relatively move the third mold part and the parison to an extent such that the entire interior periphery of both the container finish and the inflatable portion of the parison are out of surface contact with said mold third part; and finally injecting air under pressure into said parison (1) to substantially simultaneously and uniformly inflate the peripheral portion of the inflatable part of said parison, (2) to chill the interior surfaces of the container finish, and (3) to form a finish which is initially injection molded and finally blow molded.

2. In a method as defined in claim 1, the further improvement of continuously maintaining the exterior portions of the container finish as injection molded in contact with said first part of said multi-part injection mold throughout the performance of the steps of relatively moving and finally injecting air under pressure.

References Cited by the Examiner

UNITED STATES PATENTS

| | | | |
|---|---|---|---|
| 3,019,000 | 5/1963 | Makowski | 264—97 |
| 3,170,970 | 2/1965 | Adams | 264—97 |
| 3,170,971 | 2/1965 | Ninneman | 264—97 |
| 3,172,929 | 3/1965 | Santelli | 264—97 |

FOREIGN PATENTS 1,281,937  12/1961  France.

ALEXANDER H. BRODMERKEL, *Primary Examiner.*

ROBERT F. WHITE, *Examiner.*

R. B. MOFFITT, *Assistant Examiner.*